United States Patent
Kim et al.

(10) Patent No.: US 9,632,651 B2
(45) Date of Patent: Apr. 25, 2017

(54) MOBILE TERMINAL AND CONTROL METHOD THEREOF

(71) Applicant: LG ELECTRONICS INC., Seoul (KR)

(72) Inventors: Seho Kim, Seoul (KR); Inhwan Park, Suwon (KR)

(73) Assignee: LG ELECTRONICS INC., Seoul (KR)

( * ) Notice: Subject to any disclaimer, the term of this patent is extended or adjusted under 35 U.S.C. 154(b) by 332 days.

(21) Appl. No.: 13/907,330

(22) Filed: May 31, 2013

(65) Prior Publication Data

US 2013/0332870 A1 Dec. 12, 2013

(30) Foreign Application Priority Data

Jun. 7, 2012 (KR) .................... 10-2012-0061085

(51) Int. Cl.
*G06F 3/048* (2013.01)
*G06F 3/0481* (2013.01)
*G06F 3/0488* (2013.01)
*H04M 1/725* (2006.01)

(52) U.S. Cl.
CPC ........ *G06F 3/0481* (2013.01); *G06F 3/04886* (2013.01); *H04M 1/72552* (2013.01)

(58) Field of Classification Search
CPC .. G06F 15/16; G06F 17/30905; G06F 3/0481; G06F 3/04883; G06F 17/30867; G06F 2203/0339; G06F 2203/0381; G06F 3/041; G06F 3/0414; G06F 3/048; G06F 3/0486; G06F 3/0488; G06F 3/14
See application file for complete search history.

(56) References Cited

U.S. PATENT DOCUMENTS

| 2004/0024822 A1* | 2/2004 | Werndorfer ........... G06F 3/0481 709/206 |
| 2004/0078448 A1* | 4/2004 | Malik ..................... H04L 51/04 709/206 |
| 2005/0055639 A1* | 3/2005 | Fogg ..................... G06Q 10/10 715/262 |
| 2005/0188320 A1* | 8/2005 | Bocking ............... G06F 3/0482 715/752 |
| 2006/0004914 A1* | 1/2006 | Kelly ..................... G06Q 30/00 709/219 |

(Continued)

*Primary Examiner* — William Bashore
*Assistant Examiner* — Rayeez Chowdhury
(74) *Attorney, Agent, or Firm* — KED & Associates LLP

(57) ABSTRACT

A mobile terminal using a plurality of message services and a control method thereof are provided. The mobile terminal includes: a display unit configured to display list information including a plurality of identification items corresponding to a plurality of message windows, respectively, when the plurality of message windows are open for message communication between or among a plurality of conversation participants; and a controller configured to invite at least some of conversation participants of a first message window corresponding to a first identification item to a second message window corresponding to a second identification item when the first identification item, among the plurality of identification items, partially overlaps with the second identification item according to a touch input applied to the display unit.

23 Claims, 16 Drawing Sheets

(56) References Cited

U.S. PATENT DOCUMENTS

| | | | |
|---|---|---|---|
| 2006/0117263 A1* | 6/2006 | Locke | G06Q 10/107 715/751 |
| 2008/0028031 A1* | 1/2008 | Bailey | G06Q 10/10 709/207 |
| 2008/0250332 A1* | 10/2008 | Farrell | G06Q 10/10 715/753 |
| 2009/0094543 A1* | 4/2009 | Li | G06Q 30/02 715/765 |
| 2010/0205538 A1* | 8/2010 | Han | H04M 1/72552 715/752 |
| 2010/0262928 A1* | 10/2010 | Abbott | G06F 3/04817 715/769 |
| 2010/0281423 A1* | 11/2010 | Kano | G06F 3/0481 715/794 |
| 2012/0209926 A1* | 8/2012 | Backholm | G06Q 50/01 709/206 |

* cited by examiner

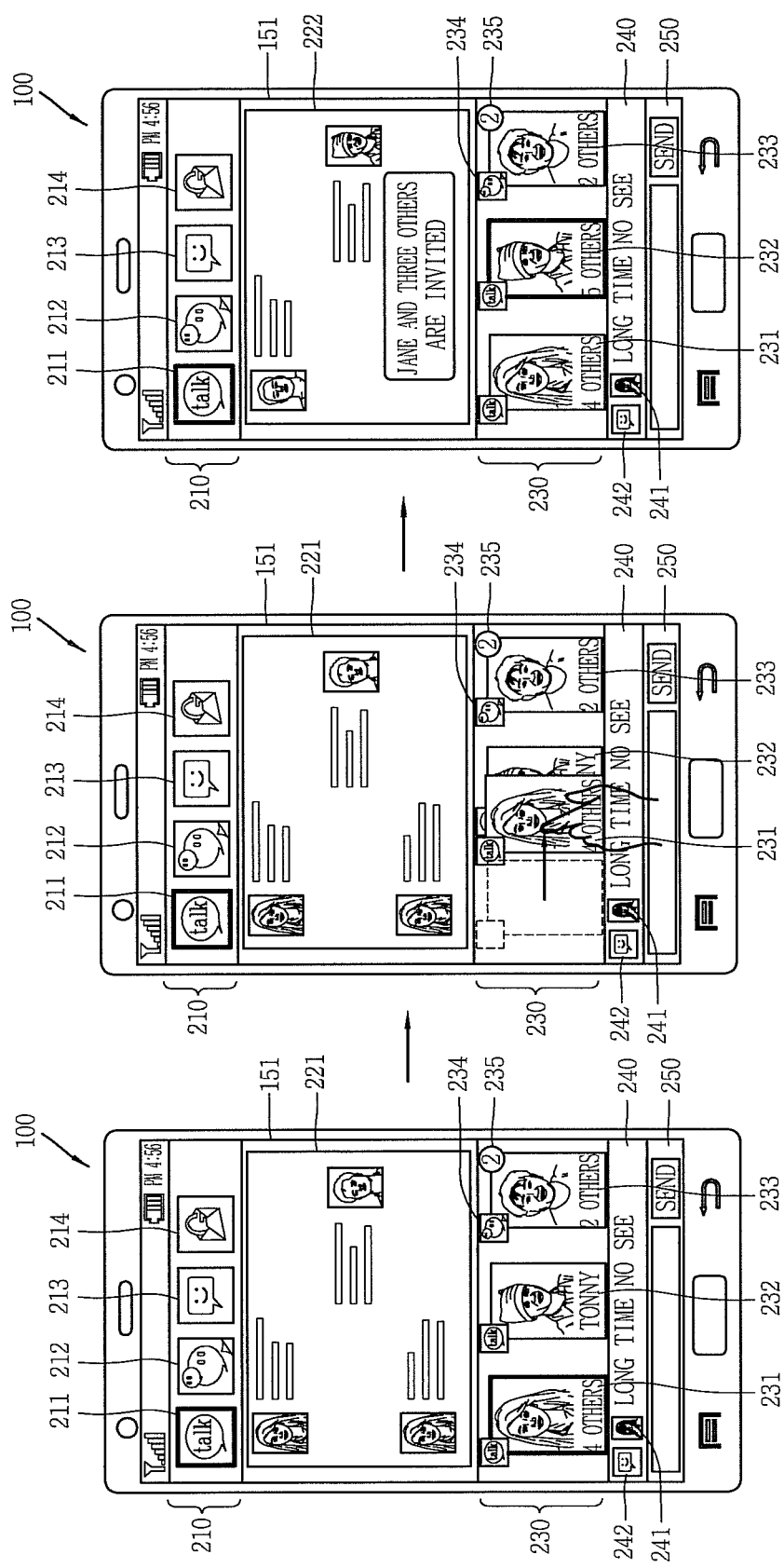

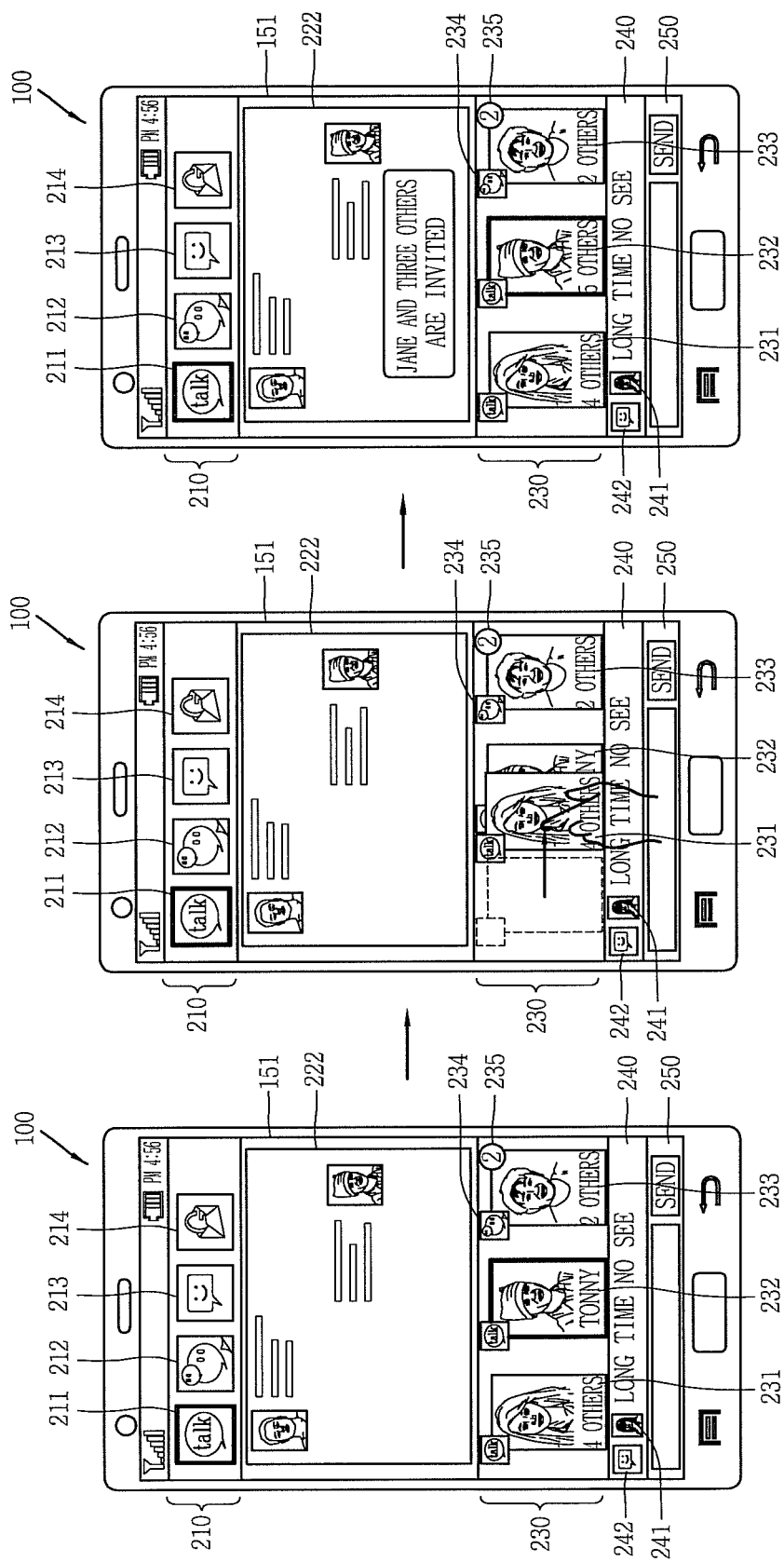

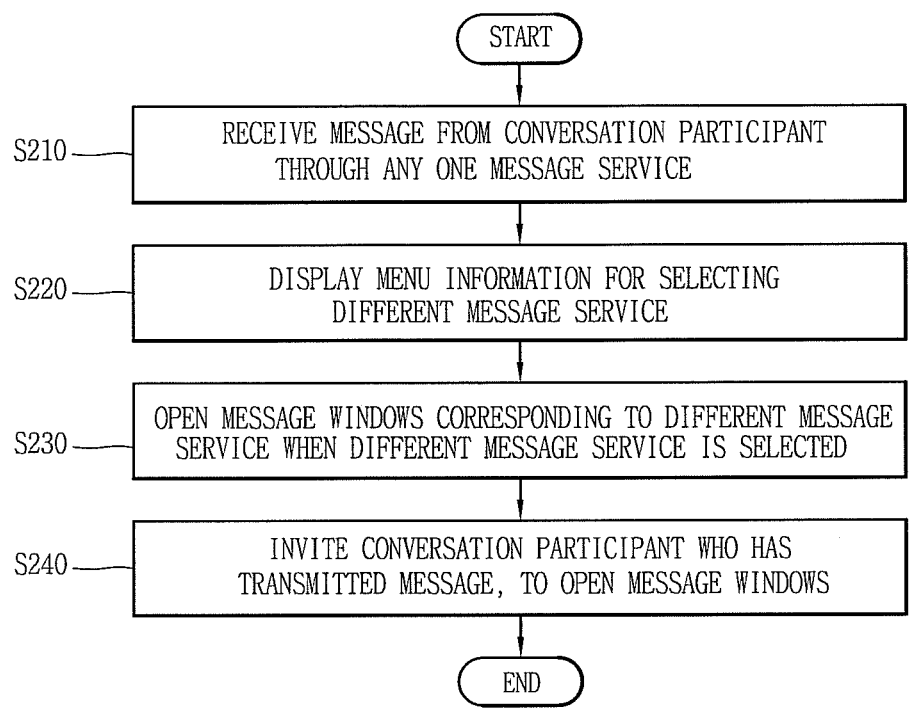

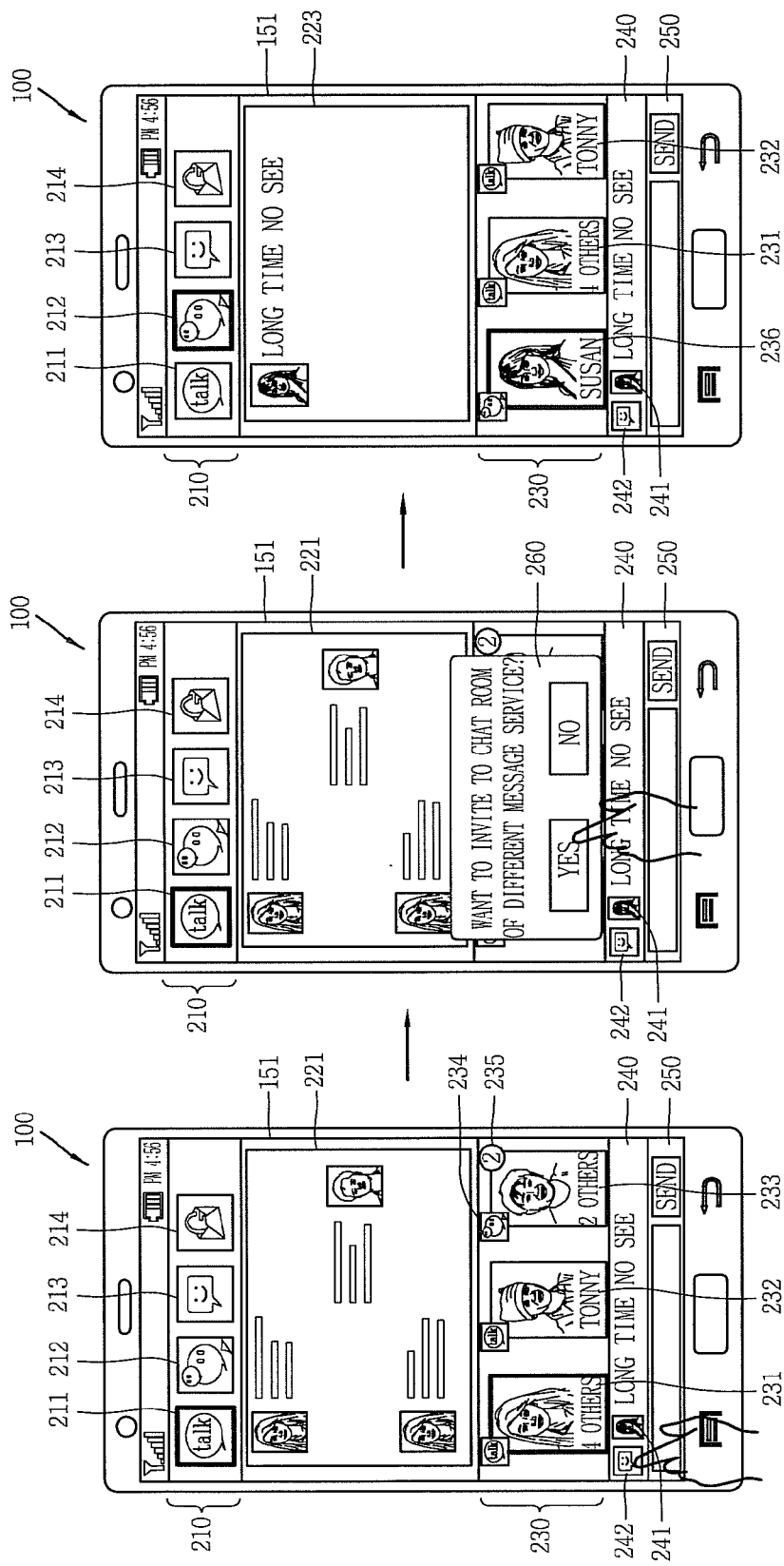

MOBILE TERMINAL AND CONTROL METHOD THEREOF

CROSS-REFERENCE TO RELATED APPLICATION(S)

Pursuant to 35 U.S.C. §119(a), this application claims the benefit of earlier filing date and right of priority to Korean Application No. 10-2012-0061085, filed on Jun. 7, 2012, the contents of which is incorporated by reference herein in its entirety.

BACKGROUND

1. Field

The present disclosure relates to a mobile terminal, and particularly, to a mobile terminal using a plurality of message services and a control method thereof.

2. Background

A terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or device. Various attempts have been made to implement complicated functions in such a multimedia device by means of hardware or software.

On the strength of such improvement, mobile terminals are able to perform message communication between or among a plurality of conversation participants using a plurality of message services. However, performing message communication by changing message services is very inconvenient for users.

SUMMARY OF THE INVENTION

Therefore, an aspect of the detailed description is to provide a user interface of a mobile terminal capable of enhancing user convenience in performing message communication between or among a plurality of conversation participants by using a plurality of message services.

To achieve these and other advantages and in accordance with the purpose of this specification, as embodied and broadly described herein, a mobile terminal includes: a display unit configured to display list information including a plurality of identification items corresponding to a plurality of message windows (or chat rooms), respectively, when the plurality of message windows are open for message communication between or among a plurality of conversation participants; and a controller configured to invite at least some of conversation participants of a first message window corresponding to a first identification item to a second message window corresponding to a second identification item when the first identification item, among the plurality of identification items, partially overlaps with the second identification item according to a touch input applied to the display unit.

In an embodiment, when any one of the plurality of identification items is selected, the controller may control the display unit to display the content of conversation of a message window corresponding to the any one selected identification item.

In an embodiment, in a state in which the content of conversion of the first message window is displayed, when the at least some of the conversation participants are invited to the second message window, the controller may change the content of conversation of the first message window to the content of conversation of the second message window. Also, in response to a touch input applied to the display unit, the controller may change the content of conversation of a message window corresponding to the selected identification item selected to the content of conversation of a different message window. Also, when a conversation participant is designated in the message window corresponding to the selected identification item by a touch input applied to the display unit, the controller may control the display unit to extract a message received from the designated conversation participant from the content of conversation and display the extracted message.

In an embodiment, the plurality of message windows may be open by using a plurality of message services.

In an embodiment, when a message is received through any one of the plurality of message services from a conversation participant having an account with respect to the plurality of message services, the controller may check whether or not a different message service among the plurality of message services is selected. Also, when the different message service is selected, the controller may open a message window corresponding to the different message service and invite a conversation participant which has transmitted the received message to a message window corresponding to the different message service.

In an embodiment, the controller may control the display unit to display additional information regarding each of the plurality of message windows. The additional information may include at least one of source information indicating a usage message service with respect to each of the plurality of message windows, information regarding a conversation participant, and information regarding the number of unread messages.

In an embodiment, when a touch input applied to the information regarding the number of unread messages is sensed, the controller may control the display unit to generate a pop-up window and display the unread message(s) on the pop-up window.

To achieve these and other advantages and in accordance with the purpose of this specification, as embodied and broadly described herein, a method for controlling a mobile terminal including a display unit formed to sense a touch input is provided. The control method includes: opening a plurality of message windows for message communication between or among a plurality of conversation participants; displaying a list information including a plurality of items corresponding to the plurality of message windows, respectively; and when first and second items among the plurality of items overlap partially with each other by a touch input applied to the display unit, inviting at least some of the conversation participants of a first message window corresponding to the first item to a second message window corresponding to the second item.

In an embodiment, the control method may further include: when any one of the plurality of items is selected, displaying the content of conversation of a message window corresponding to the selected item. Also, the control method may further include: when at least some of the conversation participants are invited to the second message window in a state in which the content of conversation of the first message window is displayed, changing the content of conversation of the first message window to the content of conversation of the second message window.

In an embodiment, in opening the plurality of message windows, the plurality of message windows may be open by using a plurality of message services.

In an embodiment, the control method may further include: when a message is received from a conversation participant having an account with respect to the plurality of message services through any one of the plurality of message services, checking whether or not a different message service among the plurality of message services is selected; and when a different message service is selected, opening a message window corresponding to the different message service and inviting the conversation participant which has transmitted the received message, to the message window corresponding to the different message service.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The embodiments will be described in detail with reference to the following drawings in which like reference numerals refer to like elements wherein:

FIGS. 5A and 5B are conceptual views showing examples of operations of the mobile terminal according to the control method of FIG. 4.

FIG. 6 is a flow chart illustrating a method for controlling a mobile terminal according to another embodiment of the present invention.

FIG. 7 is a conceptual view showing an example of an operation of the mobile terminal according to the control method of FIG. 6.

DETAILED DESCRIPTION

Description will now be given in detail of the exemplary embodiments, with reference to the accompanying drawings. For the sake of brief description with reference to the drawings, the same or equivalent components will be provided with the same reference numbers, and description thereof will not be repeated.

A terminal may be implemented in various types. For instance, the terminal in the present description includes a mobile terminal such as a portable phone, a smart phone, a notebook computer, a digital broadcasting terminal, Personal Digital Assistants (PDA), Portable Multimedia Player (PMP), a navigator, and a fixed terminal such as a digital TV, a desktop computer, etc. It is assumed that the terminal of the present invention is a mobile terminal. However, it will be obvious to those skilled in the art that the present invention may be also applicable to the fixed terminal, except for specific configurations for mobility.

Figure 1:
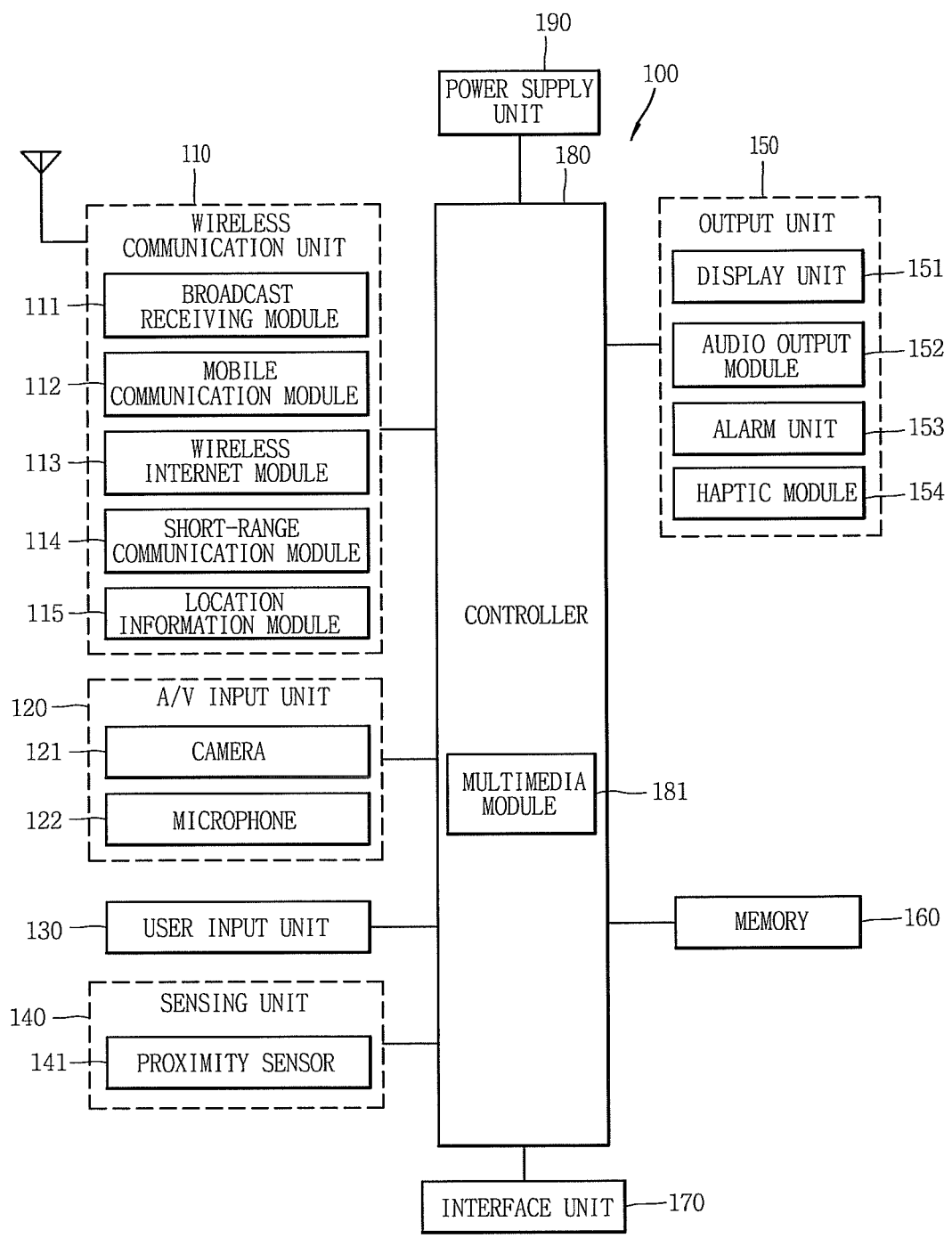
FIG. 1 is a block diagram illustrating a mobile terminal in relation to the present invention.

FIG. 1 is a block diagram of a mobile terminal 100 according to an embodiment of the present invention.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

Hereinafter, each of the above components will be explained.

The wireless communication unit 110 typically includes one or more components allowing radio communication between the mobile terminal 100 and a wireless communication system or a network in which the mobile terminal is located. For example, the wireless communication unit may include at least one of a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may be provided via a mobile communication network and in this case, the broadcast associated information may be received by the mobile communication module 112. Broadcast signals and/or broadcast-associated information received via the broadcast receiving module 111 may be stored in the memory 160.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception.

The wireless Internet module 113 supports wireless Internet access for the mobile communication terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for acquiring a location (or position) of the mobile communication terminal. For example, the location information module 115 may include a GPS (Global Positioning System) module.

The A/V input unit 120 is configured to receive an audio or video signal. The A/V input unit 120 may include a camera 121 and a microphone 122. The camera 121 processes image data of still pictures or video acquired by an image capture device in a video capturing mode or an image capturing mode. The processed image frames may be displayed on a display unit 151. The image frames processed by the camera 121 may be stored in the memory 160 or transmitted via the wireless communication unit 110. Two or more cameras 121 may be provided according to the configuration of the mobile communication terminal.

The microphone 122 may receive sounds (audible data) via a microphone in a phone call mode, a recording mode, a voice recognition mode, and the like, and can process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile communication terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of a user's touch (contact) with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141. Further, the sensing unit 140 may include a touch sensor (not shown) for sensing a touch operation with respect to the display unit 151.

The touch sensor may be implemented as a touch film, a touch sheet, a touch pad, and the like. The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

If the display unit 151 and the touch sensor have a layered structure therebetween, the display unit 151 may be used as an input device rather than an output device. In this case, the structure may be referred to as a touch screen.

When the touch screen is implemented as a capacitance type, proximity of a pointer to the touch screen is sensed by changes of an electromagnetic field. In this case, the touch screen (touch sensor) may be categorized into a proximity sensor 141.

The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

The display unit 151 may include at least one of a Liquid Crystal Display (LCD), a Thin Film Transistor-Liquid Crystal Display (TFT-LCD), an Organic Light-Emitting Diode (OLED), a flexible display, a three-dimensional (3D) display and an e-ink display.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface portion of the display unit 151 may also be implemented to be optically transparent. Under this configuration, a user can view an object positioned at a rear side of a body through a region occupied by the display unit 151 of the body.

The display unit 151 may be implemented in two or more in number according to a configured aspect of the mobile terminal 100. For instance, a plurality of displays may be arranged on one surface integrally or separately, or may be arranged on different surfaces.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm unit 153 outputs signals notifying occurrence of events from the mobile terminal 100. The events occurring from the mobile terminal 100 may include call received, message received, key signal input, touch input, and so on. The alarm unit 153 may output not only video or audio signals, but also other types of signals such as signals notifying occurrence of events in a vibration manner. Here, the video signal or audio signal may be outputted through the display unit 151 or the audio output module 152. Accordingly, the display unit 151 or the audio output module 152 may be categorized as part of the alarm unit 153.

The haptic module 154 generates various tactile effects which a user can feel. A representative example of the tactile effects generated by the haptic module 155 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data relating to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), a Universal Subscriber Identity Module (USIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image.

The power supply unit 190 serves to supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Hereinafter, will be explained a method for processing a user's input to the mobile terminal 100.

The user input unit 130 is manipulated to receive a command for controlling the operation of the mobile terminal 100, and may include a plurality of manipulation units. The manipulation units may be referred to as manipulating portions, and may include any type of ones that can be manipulated in a user's tactile manner.

Various types of visible information may be displayed on the display unit 151. Such information may be displayed in several forms, such as character, number, symbol, graphic, icon or the like. Alternatively, such information may be implemented as a 3D stereoscopic image. For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another. For example, an output window and an input window may be displayed at upper and lower portions of the display unit 151, respectively. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted, or a text output on the output window may be input to an application.

In addition to the input manner illustrated in the embodiments, the display unit 151 or the touch pad may be scrolled to receive a touch input. A user may scroll the display unit 151 or the touch pad to move a cursor or pointer positioned on an object (subject), e.g., an icon or the like, displayed on the display unit 151. In addition, in case of moving a finger on the display unit 151 or the touch pad, the path of the finger being moved may be visibly displayed on the display unit 151, which can be useful upon editing an image displayed on the display unit 151.

One function of the mobile terminal may be executed in correspondence with a case where the display unit 151 (touch screen) and the touch pad are touched together within a preset time. An example of being touched together may include clamping a body with the user's thumb and index fingers. The one function, for example, may be activating or deactivating of the display unit 151 or the touch pad.

Figure 2A:
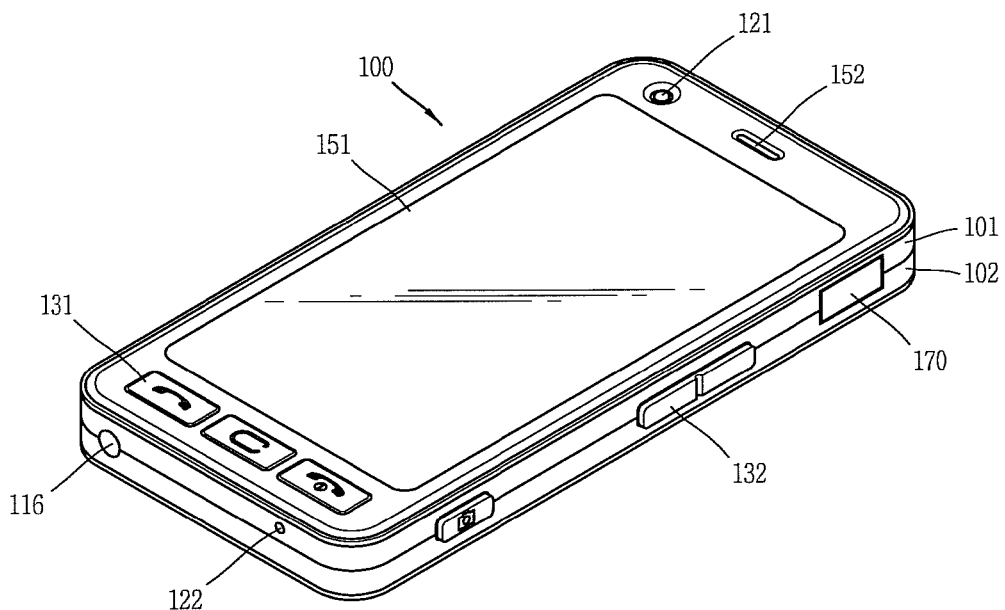
FIGS. 2A and 2B are perspective views illustrating an outer appearance of the mobile terminal in relation to the present invention.
Figure 2B:
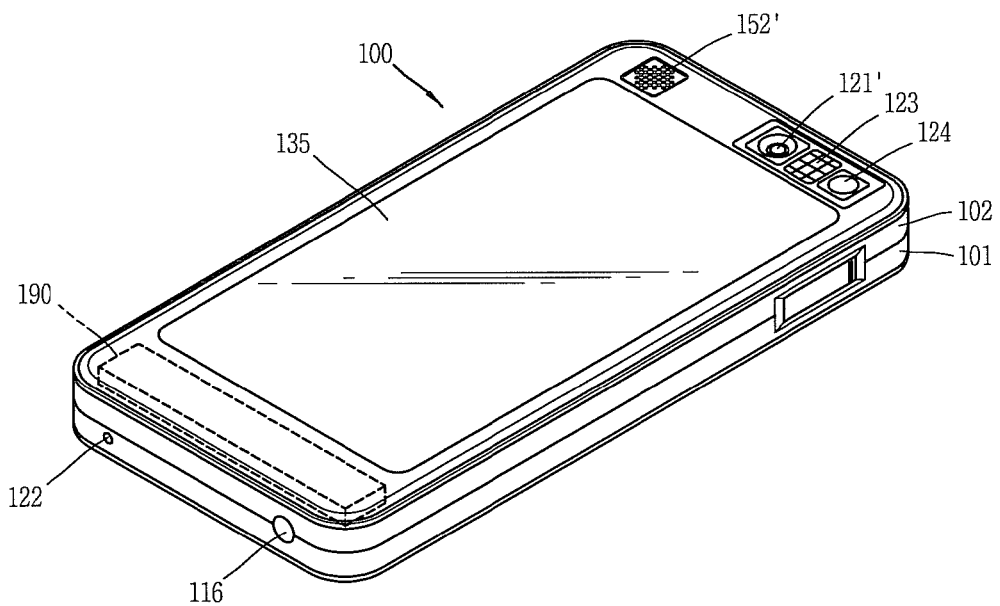

FIGS. 2A and 2B are perspective views showing the appearance of the mobile terminal 100 of the present invention. FIG. 2A is a view showing a front surface and one side surface of the mobile terminal 100 in accordance with the present disclosure, and FIG. 2B is a view showing a rear surface and another side surface of the mobile terminal 100 of FIG. 2A.

As shown in FIG. 2A, the mobile terminal 100 is a bar type mobile terminal. However, the present disclosure is not limited to this, but may be applied to a slide type in which two or more bodies are coupled to each other so as to perform a relative motion, a folder type, or a swing type, a swivel type and the like.

A case (casing, housing, cover, etc.) forming an outer appearance of a body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, a user input unit 130 (refer to FIG. 1), a microphone 122, an interface unit 170, etc.

The display unit 151 occupies most parts of a main surface of the front case 101. The audio output unit 152 and the camera 121 are arranged at a region adjacent to one end of the display unit 151, and the user input unit 131 and the microphone 122 are arranged at a region adjacent to another end of the display unit 151. The user input unit 132, the interface unit 170, etc. may be arranged on side surfaces of the front case 101 and the rear case 102.

The user input unit 130 is manipulated to receive a command for controlling the operation of the mobile terminal 100, and may include a plurality of manipulation units 131 and 132.

The manipulation units 131 and 132 may receive various commands. For instance, the first manipulation 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Referring to FIG. 2B, a camera 121' may be additionally provided on the rear case 102. The camera 121' faces a direction which is opposite to a direction faced by the camera 121 (refer to FIG. 2A), and may have different pixels from those of the camera 121.

For example, the camera 121 may operate with relatively lower pixels (lower resolution). Thus, the camera 121 may be useful in reducing the size of transmission data, in a case that a user can capture his face and send it to another party during a video call or the like. On the other hand, the camera 121' may operate with a relatively higher pixels (higher resolution) such that it can be useful for a user to obtain higher quality pictures for later use.

The cameras 121 and 121' may be installed at the terminal body so as to rotate or pop-up.

A flash 123 and a mirror 124 (not shown) may be additionally disposed close to the camera 121'. The flash 123 operates in conjunction with the camera 121' when taking a picture using the camera 121'. The mirror 124 can cooperate with the camera 121' to allow a user to photograph himself in a self-portrait mode.

An audio output unit 152' may be additionally arranged on a rear surface of the terminal body. The audio output unit 152' may cooperate with the audio output unit 152 (refer to FIG. 2A) disposed on a front surface of the terminal body so as to implement a stereo function. Also, the audio output unit 152' may be configured to operate as a speakerphone.

A broadcast signal receiving antenna 116 as well as an antenna for calling may be additionally disposed on a side surface of the terminal body. The broadcast signal receiving antenna 116 of the broadcast receiving module 111 (refer to FIG. 1) may be configured to retract into the terminal body.

A power supply unit 190 for supplying power to the mobile terminal 100 is mounted to the body. The power supply unit 190 may be mounted in the body, or may be detachably mounted to the body.

A touch pad 135 for sensing touch may be additionally mounted to the rear case 102. Like the display unit 151 (refer to FIG. 2A), the touch pad 135 may be formed to be light-transmissive. The touch pad 135 may be also additionally mounted with a rear display unit for outputting visual information. Information output from the display unit 151 (front display) and the rear display can be controlled by the touch pad 135.

The touch pad 135 operates in association with the display unit 151. The touch pad 135 may be disposed on the rear surface of the display unit 151 in parallel. The touch pad 135 may have a size equal to or smaller than that of the display unit 151.

Hereinafter, a user interface for user convenience in performing message communication between or among a plurality of conversation participants by using a plurality of message services in the mobile terminal 100 according to an embodiment of the present invention will be described. Here, the conversation participants refer to a user and a terminal of a counterpart that perform message communication. Message communication may be performed through various message services. The message services may include, for example, a service supporting real-time chatting, a text message service such as SMS (Short Message Service), MMS (Multi-media Message Service), or the like, an e-mail service, and the like.

Figure 3:
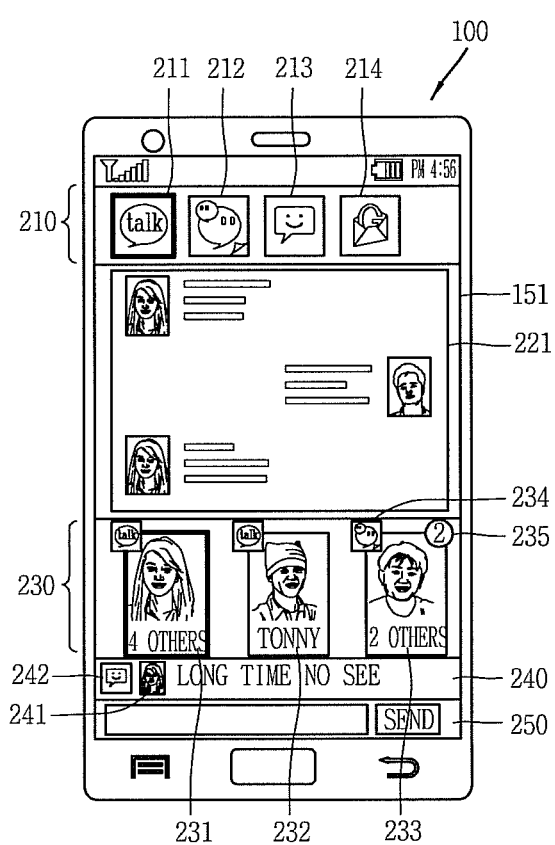
FIG. 3 is a conceptual view illustrating a user interface of the mobile terminal in relation to message communication according to an embodiment of the present invention.

FIG. 3 is a conceptual view illustrating a user interface of the mobile terminal 100 in relation to message communication according to an embodiment of the present invention. Referring to FIG. 3, when an application that manages message communication between or among a plurality of conversation participants is executed, a screen image (hereinafter, referred to as a 'conversation management screen image') displayed by the display unit 151 (See FIG. 1) is illustrated.

The conversation management application may integrally manage a plurality of open message windows by using a plurality of different message services. To this end, the conversation management screen image may include information 210 regarding a list of a plurality of message services registered to the conversation management application (hereinafter, referred to as a 'messaging service list'), the content of conversation 221 of a selected message window, information 230 referring a list of a plurality of message windows that are currently open (hereinafter, referred to as a 'message window list'), the most recently received message 240, a message input window 250, and the like.

The messaging service list 210 may be disposed in a first region of the conversation management screen image. The messaging service list 210 includes a plurality of indicators 211 to 214 corresponding to a plurality of message services, respectively. An indicator indicating a message service used in a currently selected message window (i.e., a message window in which the content of conversation is being displayed) among the plurality of indicators 211 to 214 may be displayed to be discriminated from the other remaining indicators. For example, when the first indicator indicates the message service of the currently selected message window, graphic effects such as a change in a color, brightness, shape, highlighting edges, blinking, and the like, are provided to the first indicator 211 to make the first indicator 211 discriminated from the other remaining second to fourth indicators 212 to 214.

When any one of the plurality of message windows managed by the conversation management application is selected, the content of conversation 221 of the selected message window may be disposed in a second region of the conversation management screen image. The content of conversation 221 of the selected message window may include messages and profile information of the respective conversation participants. Meanwhile, the content of conversation of an unselected message window may not be displayed on the screen, and conversation between or among conversation participants may be processed as a background task.

The list 230 of message windows may be displayed in a third region of the conversation management screen image. The list 230 of message windows may include a plurality of items 231 to 233 corresponding to the plurality of message windows, respectively. An item indicating a currently selected message window among the plurality of items 231 to 233 may be displayed to be discriminated from the other remaining items. For example, when the first item 231 indicates a currently selected message window, graphic effects such as a change in a color, brightness, shape, highlighting edges, blinking, and the like, are provided to the first item 231 to make the first item 231 discriminated from the other remaining second and third items 232 and 233.

Also, each item may include profile information (e.g., information regarding a representative participant, the number of participants, and the like) of conversation participants, source information 234 indicating a usage message service, information 235 regarding the number of unread messages, and the like, as additional information regarding each corresponding message window.

The most recently received message 240 may be disposed in a fourth region of the conversation management screen image. The most recently received message 240 may include profile information 241 of a sender, source information 242 indicating a corresponding message service, and the like.

A message input window 250 may be disposed in a fifth region of the conversation management screen image. A message input through the message input window 250 is transmitted as a conversation participant of the currently selected message window. Also, as the message is input, the content 221 of conversation of the currently selected message window may be updated in real time.

As illustrated, although the conversation management screen image is formed to be divided into first to fifth regions, the present invention is not limited thereto and respective regions may at least partially overlap with other regions.

Figure 4:
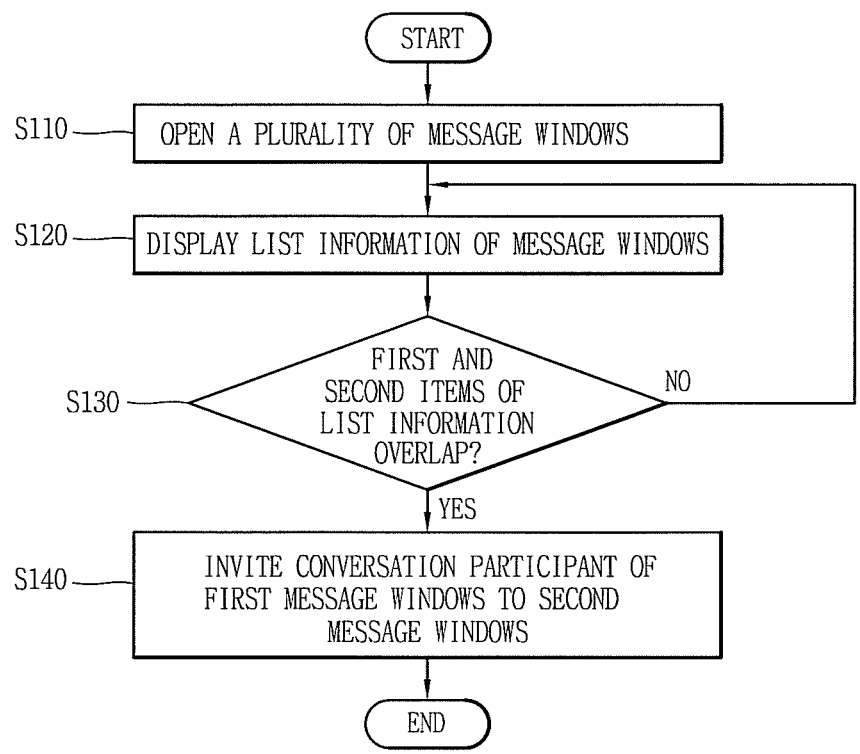
FIG. 4 is a flow chart illustrating a method for controlling a mobile terminal according to an embodiment of the present invention.

FIG. 4 is a flow chart illustrating a method for controlling the mobile terminal 100 according to an embodiment of the present invention. Referring to FIG. 4, first, a plurality of message windows for message communication between or among a plurality of conversation participants are open in executing the conversation management application in step S110.

Next, list information including a plurality of items corresponding to a plurality of message windows, respectively, is displayed in step S120.

Thereafter, whether or not a first item and a second item among the plurality of items of the list information at least partially overlap with each other is determined in step S130. In this case, the first item (or a duplicate item) may be moved according to a touch input (e.g., a drag gesture) applied to the display unit 151 and at least partially overlap with the second item.

When the first item and the second item at least partially overlap with each other, at least some of conversation participants of a first message window is invited to a second message window in step S140. In this case, the first message window corresponds to the first item, and the second message window corresponds to the second item. Also, a conversation participant who has an account with respect to a message service corresponding to the second message window, among conversation participants of the first message window may be invited to the second message window, but a conversation participant who does not have an account with respect to a message service corresponding to the second message window may be excluded from being invited to the second message window.

As described above, according to the mobile terminal 100 according to an embodiment of the present invention, list information regarding a plurality of message windows is provided and a function of inviting an conversation participant is performed as items of the list information are controlled by a touch input, whereby user convenience can be improved in managing a plurality of message windows for message communication between or among a plurality of conversation participants.

FIGS. 5A and 5B are conceptual views showing examples of operations of the mobile terminal 100 according to the control method of FIG. 4.

Referring to FIG. 5A, when the first item 231 indicating the first message window is selected from the message window list 230, the controller (See FIG. 1) may control the display unit 151 to display the content 221 of conversation of the first message window.

Thereafter, when the first item 231 is moved by a touch input such as a drag gesture to at least partially overlap with the second item 232 indicating the second message window, the controller 180 may invite at least some of the conversation participants of the first message window. In detail, the controller 180 may determine whether or not each of the conversation participants of the first message window has an account with respect to the message service corresponding to the second message window, select a conversation participant having a valid account, and invite the selected conversation participant to the second message window. For example, when the first message window and the second message window are open by using the same message service, all of the conversation participants of the first message window may be invited to the second message window.

In a state in which the content 221 of conversation of the first message window is displayed, when at least some of conversation participants of the first message window are invited to the second message window, the controller 180 may change the content of conversation displayed on the screen from the content 221 of conversation of the first message window to the content 222 of conversation of the second message window. This means that the second message window has been selected.

In this case, the controller 180 may control the display unit 151 to display the second item 232 such that the second item 232 is discriminated from the first and third items 231 and 233. Also, the controller 180 may control the display unit 151 to display information regarding the conversation participants invited to the second message window. For example, as illustrated, a statement such as "Jane and three others are invited" may be displayed together with the content 222 of conversation of the second message window.

Also, in response to a release of a touch input, the controller 180 may control the display unit 151 to move the first item 231, which has at least partially overlapped with the second item 232, to its original position.

Referring to FIG. 5B, when the second item 231 indicating the second message window is selected form the message window list 230, the controller 180 may control the display unit 151 to display the content 222 of conversation of the second message window.

Thereafter, when the first item 231 is moved to at least partially overlap with the second item 232 indicating the second message window according to a touch input such as a drag gesture, the controller 180 may invite at least some of the conversation participants of the first message window to the second message window.

When the conversation participants of the first message window are invited to the second message window, since the second message window has already been selected and the corresponding content 222 of conversation has been displayed, a change of selection of a message window and a change in the content of conversation may be omitted. Thus, when at least some of the conversation participants of the first message window are invited to the second message window in the state in which the content 22 of conversation of the second message window is displayed, the controller 180 may control the display unit 151 to maintain the content 222 of conversation of the second message window and display information regarding the conversation participants invited to the second message window. The same or similar content as that already described above with reference to FIG. 5A will be omitted.

FIG. 6 is a flow chart illustrating a method for controlling the mobile terminal 100 according to another embodiment of the present invention. Referring to FIG. 6, first, a message is received through any one of a plurality of message services from conversation participants having accounts with respect to a plurality of message services in step S210.

Next, when a message is received, menu information for selecting a different message service is displayed in step S220. For example, when a message has been received through a paid message service, a free message service among a plurality of message services is detected, and menu information implemented to determine whether to select the detected free message service according to a user input may be displayed.

Thereafter, when a different message service is selected by using the menu information, a message window corresponding to the different message service is open in step S230. Next, a conversation participant who has transmitted a message through any one message service is invited to the message window corresponding to the different message service in step S240.

As described above, according to the mobile terminal 100 according to an embodiment of the present invention, after a message is received through any one message service, a different message service to continue conversation with a corresponding sender may be selected. Thus, a message service can be simply changed according to user preference.

FIG. 7 is a conceptual view showing an example of an operation of the mobile terminal 100 according to the control method of FIG. 6. Referring to FIG. 7, the controller may control the display unit 151 to display the most recently received message 240. In other words, a received message 240 may be displayed on the screen in real time.

Next, when a touch input with respect to source information 242 indicating any one message service corresponding to the most recently received message 240 is detected, the controller 180 may control the display unit 151 to display menu information 260 for selecting a message service different from the any one message service.

Thereafter, when the different message service is selected in response to a touch input with respect to the menu information 260 is selected, the controller 180 may open a message window corresponding to the different message service and invite a conversation participant who has transmitted the received message 240, to the message window.

In this case, the controller 260 may control the display unit 151 to display the content 233 of conversation of the open message window. In this case, the content 223 of conversation of the open message window may include the most recently received message 240, profile information of the corresponding conversation participant, and the like.

Also, the controller 260 may add an item 236 corresponding to the open message window to the message window list 240. In this case, the item 236 corresponding to the open message window may be displayed to be discriminated from the other items 231 and 232, so that the user may recognize that the open message window has been selected.

Also, in response to the selection of the different message service, in other words, in response to the selection of the message service corresponding to the open message window, the controller 2600 may control the display unit 151 to highlight the indicator 212 indicating the message service newly selected from the messaging service list 210.

Figure 8A:
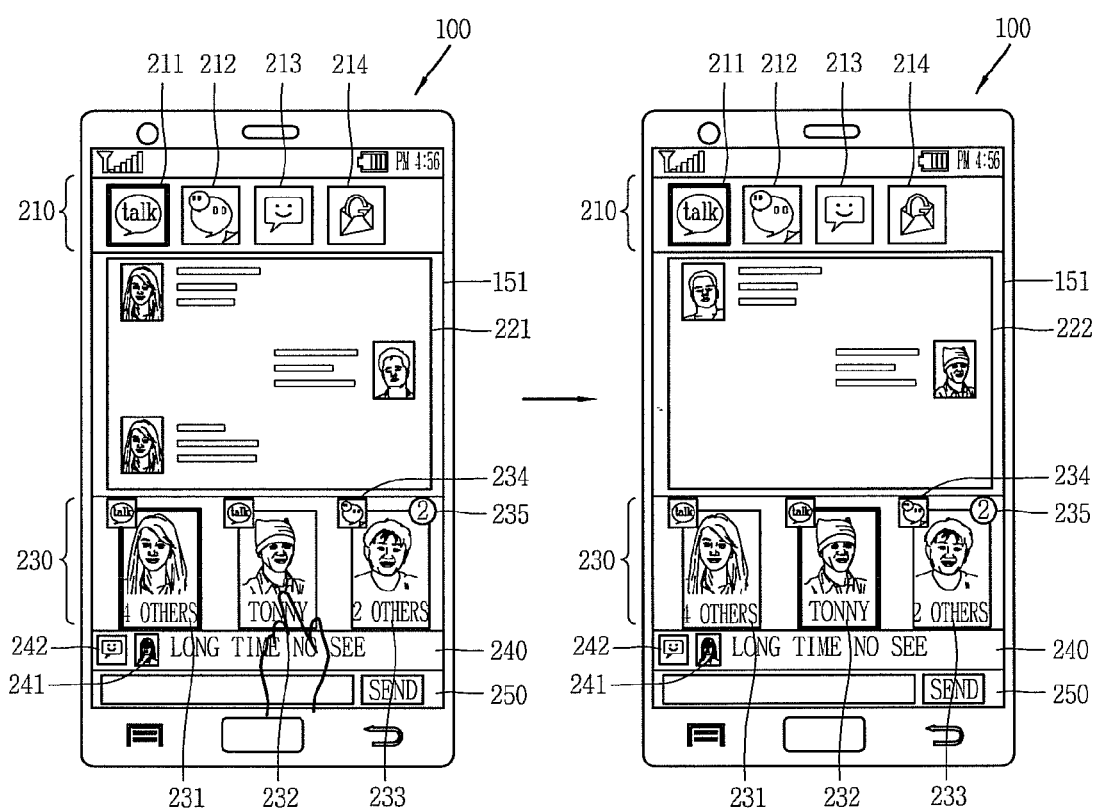
FIGS. 8A and 8B are conceptual views showing a user interface of the mobile terminal in relation to change in the content of conversation of a message window according to an embodiment of the present invention.
Figure 8B:
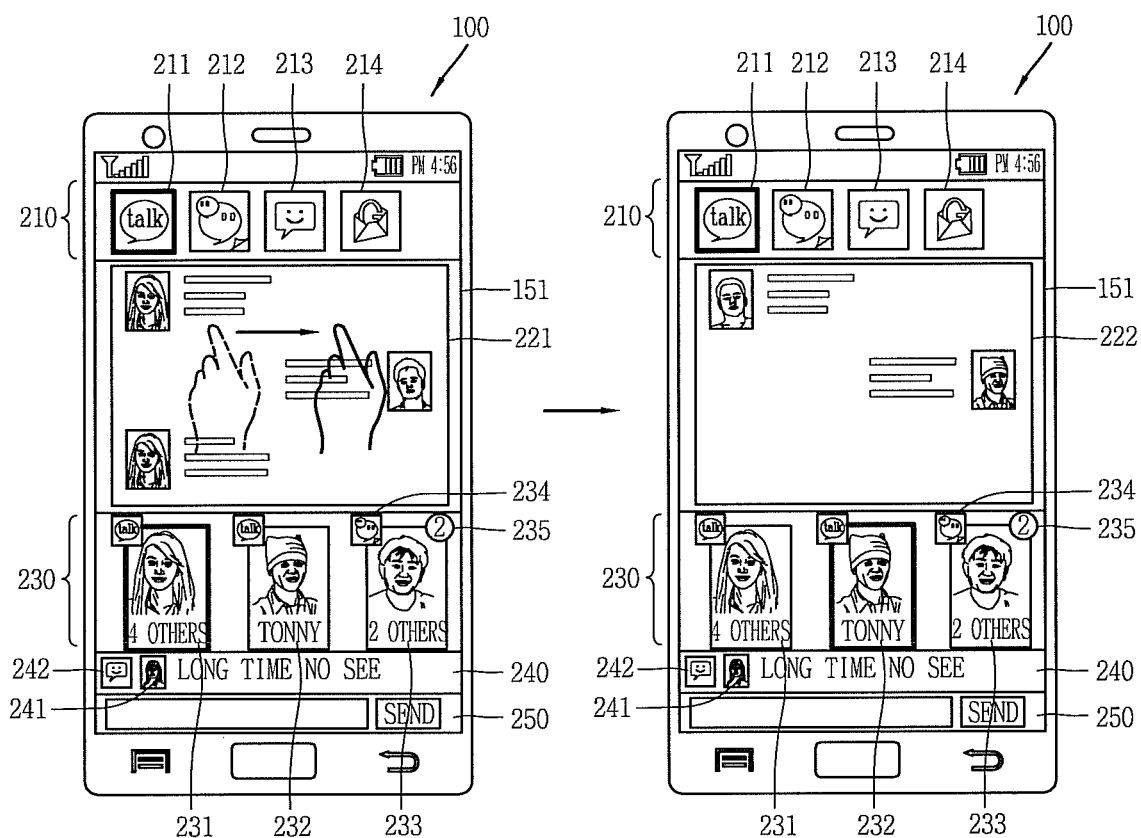

FIGS. 8A and 8B are conceptual views showing a user interface of the mobile terminal 100 in relation to change in the content of conversation of a message window according to an embodiment of the present invention.

Referring to FIG. 8A, in a state in which the first item 231 is selected and the content 2212 of conversation of the first message window is displayed, when a touch input applied to the second item 232 is detected, the controller 180 may change the content of conversation displayed on the screen from the content 221 of conversation of the first message window to the content 222 of conversation of the second message window. Thus, the user may recognize that the selected message window has been changed.

Referring to FIG. 8B, in the state in which the first item 231 is selected and the content 221 of conversation of the first message window is displayed, when a touch input such as a drag gesture or a flicking gesture is detected, the controller 180 may change the content of conversation displayed on the screen from the content 221 of conversation of the first message window to the content 222 of conversation of the second message window.

Figure 9A:
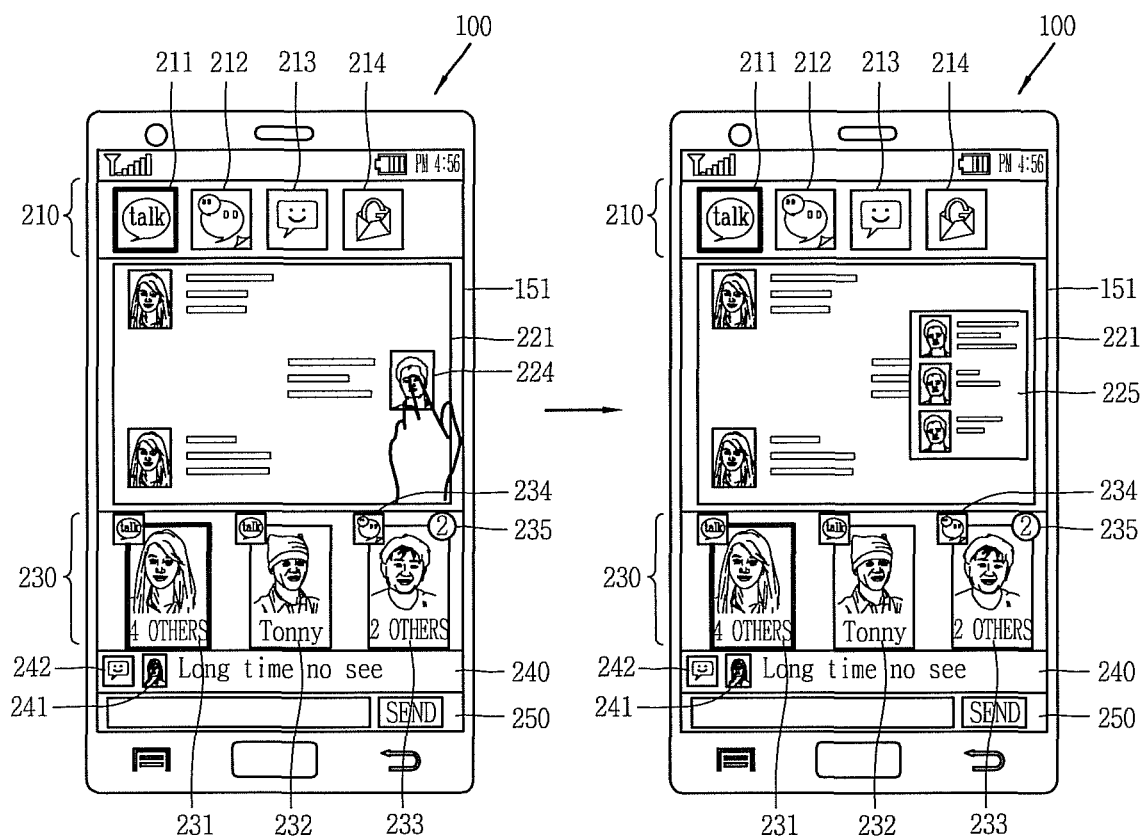
FIGS. 9A and 9B are conceptual views showing a user interface of the mobile terminal in relation to a message extraction according to an embodiment of the present invention.
Figure 9B:
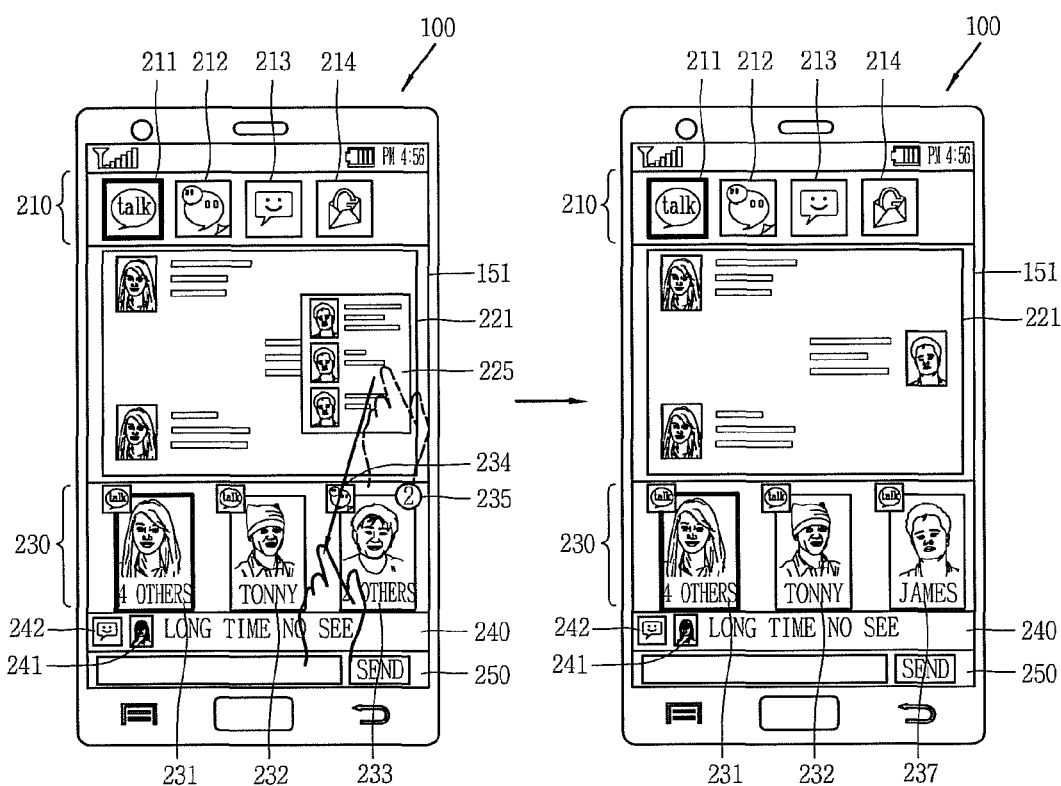

FIGS. 9A and 9B are conceptual views showing a user interface of the mobile terminal 100 in relation to a message extraction according to an embodiment of the present invention.

Referring to FIG. 9A, when a conversation participant is designated according to a touch input applied to the profile information 224 of the conversation participant in a message window corresponding to the selected item 231, the controller 180 may control the display unit 151 to extract and display a message received from the designated conversation participant from the content 221 of conversation of the corresponding message window. For example, a pop-up window 225 including the message extracted from the content 221 of conversation of the corresponding message window may be displayed together with the content 221 of conversation of the corresponding message window.

Although not shown, when a certain time has lapsed or a different touch input is detected after the pop-up window 225 is displayed, the controller 180 may control the display unit 151 to make the pop-up window 225 disappear. Accordingly, the user may simply check a message of a particular conversation participant in the conversation management screen without having to change the screen.

Referring to FIG. 9B, in a state in which the pop-up window 225 including the extracted message is displayed, when the pop-up window 225 is moved to the message window list 230 according to a touch input, the controller 180 may open a new message window and add a corresponding item 237 to the message window list 230. In this case, the designated conversation participant may be invited to the open message window and the added item 237 may include profile information of the designated conversation participant (i.e., the invited conversation participant).

Also, as the added item 237 occupies a certain region of the message window list 230, the controller 180 may control the display unit 151 to make at least one different item 233 disappear.

Figure 10:
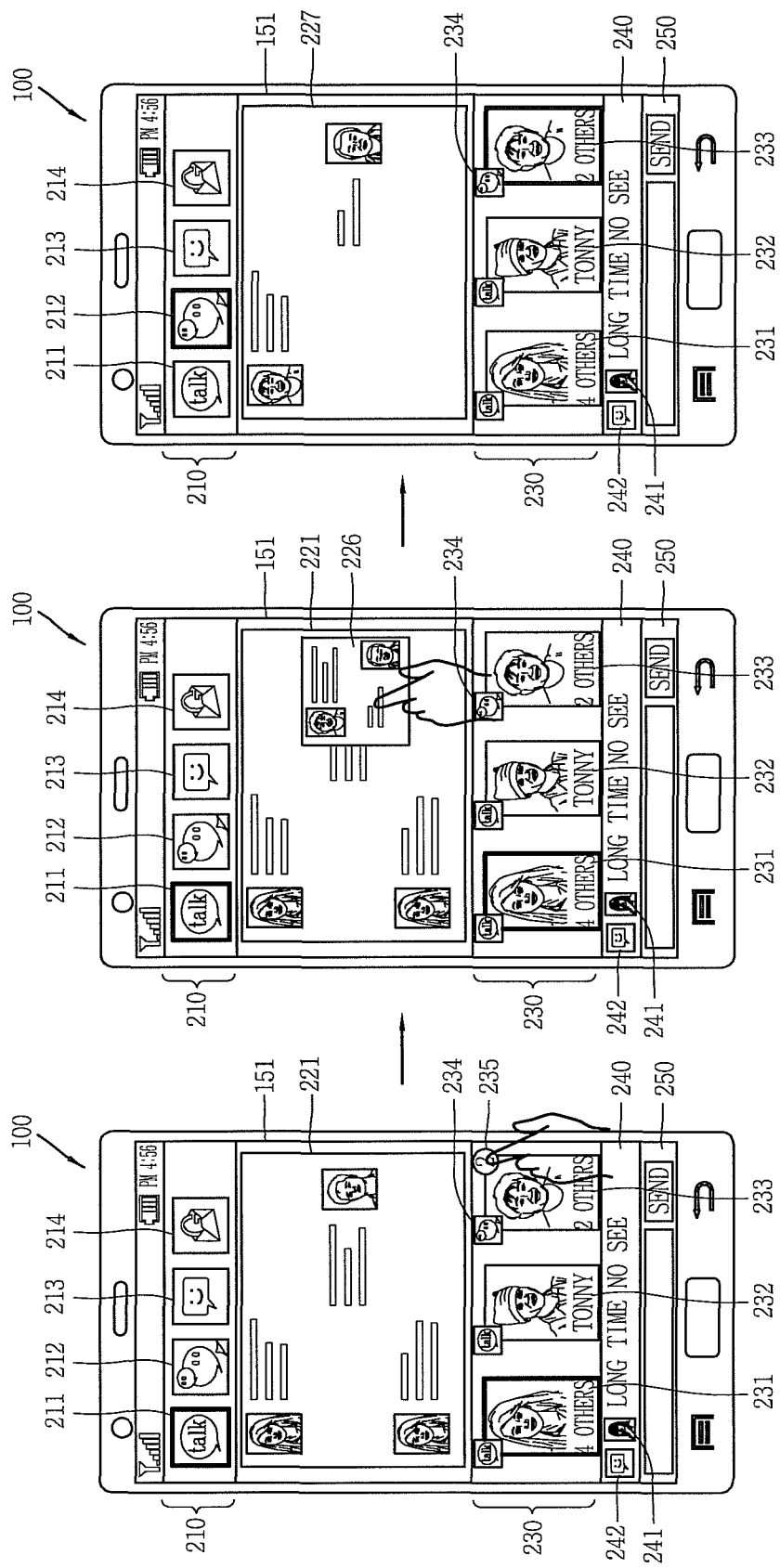
FIG. 10 is a conceptual view showing a user interface of the mobile terminal in relation to displaying of unread messages according to an embodiment of the present invention.

FIG. 10 is a conceptual view showing a user interface of the mobile terminal 100 in relation to displaying of unread messages according to an embodiment of the present invention. Referring to FIG. 10, when a touch input applied to the information 235 regarding the number of unread messages is detected as additional information of the message window, the controller 180 may generate the pop-up window 226 and control the display unit 151 to display the unread messages of the corresponding message window in the pop-up window 226. For example, in a state in which the content 221 of conversation of the first message window is displayed, when a touch input applied to the information 235 regarding the number of unread messages of a third message window is detected, the pop-up window 226 including an unread message of the third message window may be displayed together with the content 221 of conversation of the first message window. Also, as the pop-up window 226 including the unread messages is displayed, the controller 180 may control the display unit 151 to make the information 235 regarding the number of unread messages disappear.

Thereafter, when a touch input applied to the pop-up window 226 is detected, the controller 180 may change the content of conversation displayed on the screen from the content 221 of conversation of the first message window to the content 227 of conversation of the third message window in which the unread messages of the pop-up window 226 were generated. Also, in this case, the controller 180 may change the item highlighted in the message window list 230 from the first item 231 to the third item 233. Accordingly, the user may recognize that the selected message window has been changed.

Figure 11:
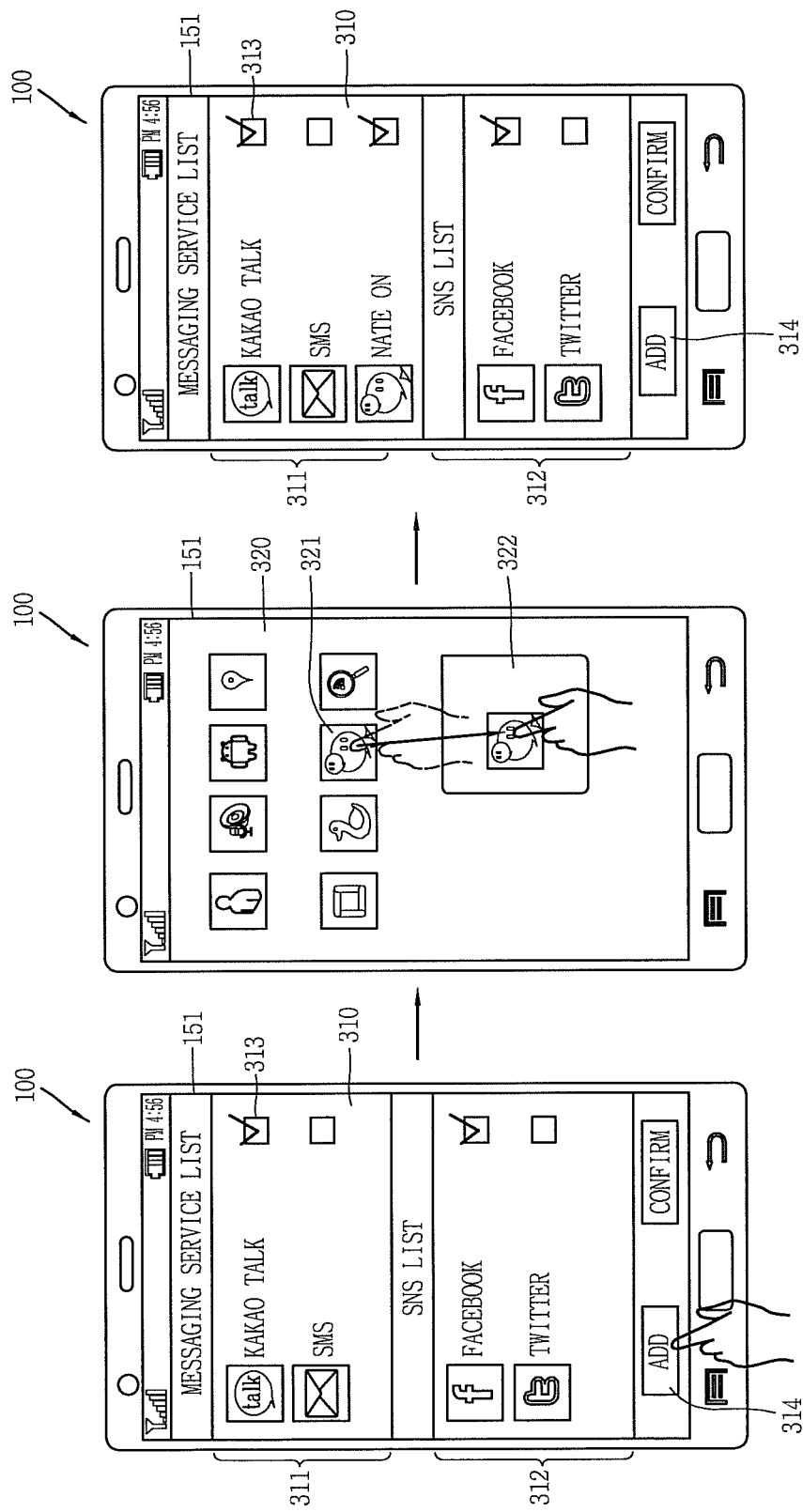
FIG. 11 is a conceptual view showing a user interface of the mobile terminal in relation to setting of a message service according to an embodiment of the present invention.

FIG. 11 is a conceptual view showing a user interface of the mobile terminal 100 in relation to setting of a message service according to an embodiment of the present invention. Referring to FIG. 11, the controller 180 may control the display unit 151 to display a message service and a set screen image 310 of a social network service (SNS). The set screen image 310 may include a messaging service list 311, an SNS list 312, a check box 313, a menu button 314, and the like.

The controller 180 may automatically search for a message service application that is convertible with the conversation management application, and add the same to the messaging service list 311. The controller 180 may determine whether to activate a corresponding message service or the SNS according to whether or not a check box 313 has a check mark.

In an embodiment of the present invention, a message service or an SNS that is not automatically searched may be manually set. This will be described in detail with reference to FIG. 11, hereinafter.

When a touch input applied to the menu button 314 for additionally setting a message service or an SNS is detected, the controller 180 may control the display unit 151 to display a home screen image 320. Here, the home screen image 320 may include an icon 321 of a message service application or an SNS application installed in the mobile terminal 100, a reception object 322 for accommodating at least one icon, and the like.

When an icon 321 (or a duplicated icon) is moved to be positioned in the reception object 322 by a touch input such as a drag gesture, the controller 180 may add a message service or an SNS corresponding to the icon 21 placed in the reception object 322 to the messaging service list 311 or the SNS list 312.

Figure 12:
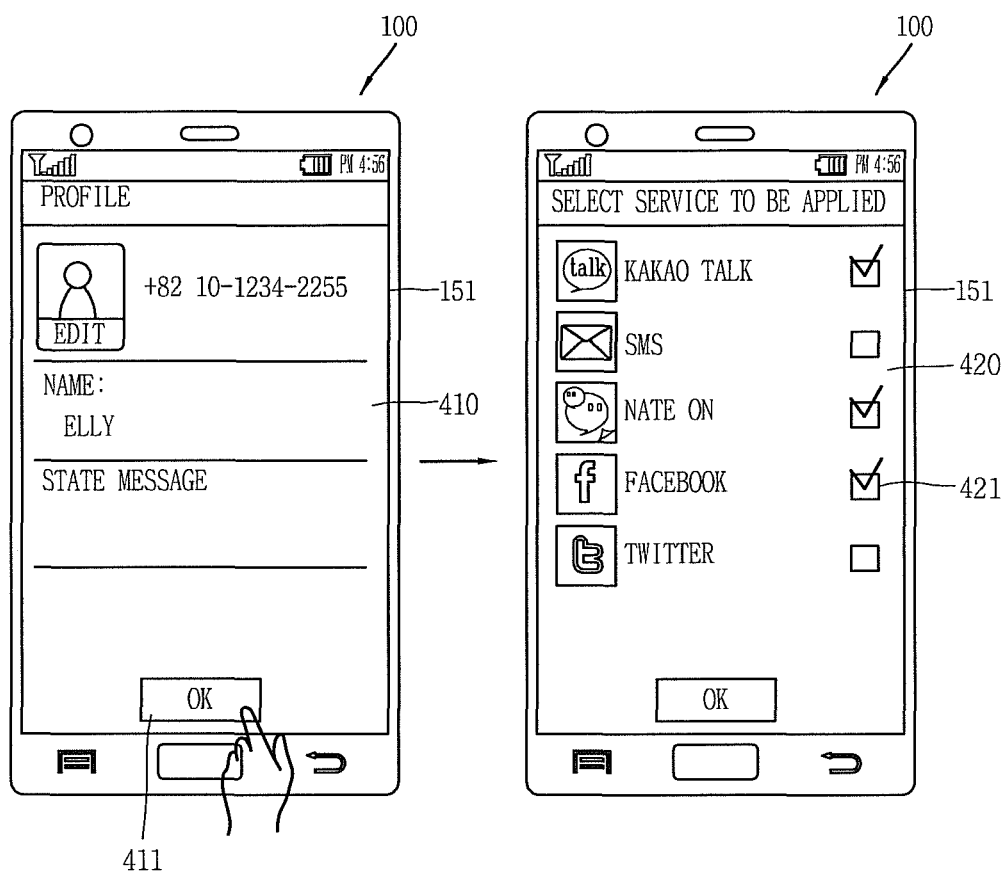
FIG. 12 is a conceptual view showing a user interface of the mobile terminal in relation to setting of user profile information according to an embodiment of the present invention.

FIG. 12 is a conceptual view showing a user interface of the mobile terminal 100 in relation to setting of user profile information according to an embodiment of the present invention. Referring to FIG. 12, the controller 180 may control the display unit 151 to display an editing screen image 410 for editing user profile information.

When a touch input applied to a menu button 411 for completing editing after the user profile information is edited in the editing screen image 410 is detected, the controller 180 may control the display unit 151 to display the list information 420 regarding the message service or the SNS. The controller 180 may determine whether to apply the edited user profile information to the corresponding message service or SNS according to whether or not the check box 421 has a check mark. Accordingly, the user may avoid editing user profile information one by one with respect to a plurality of message services or SNSs.

Figure 13:
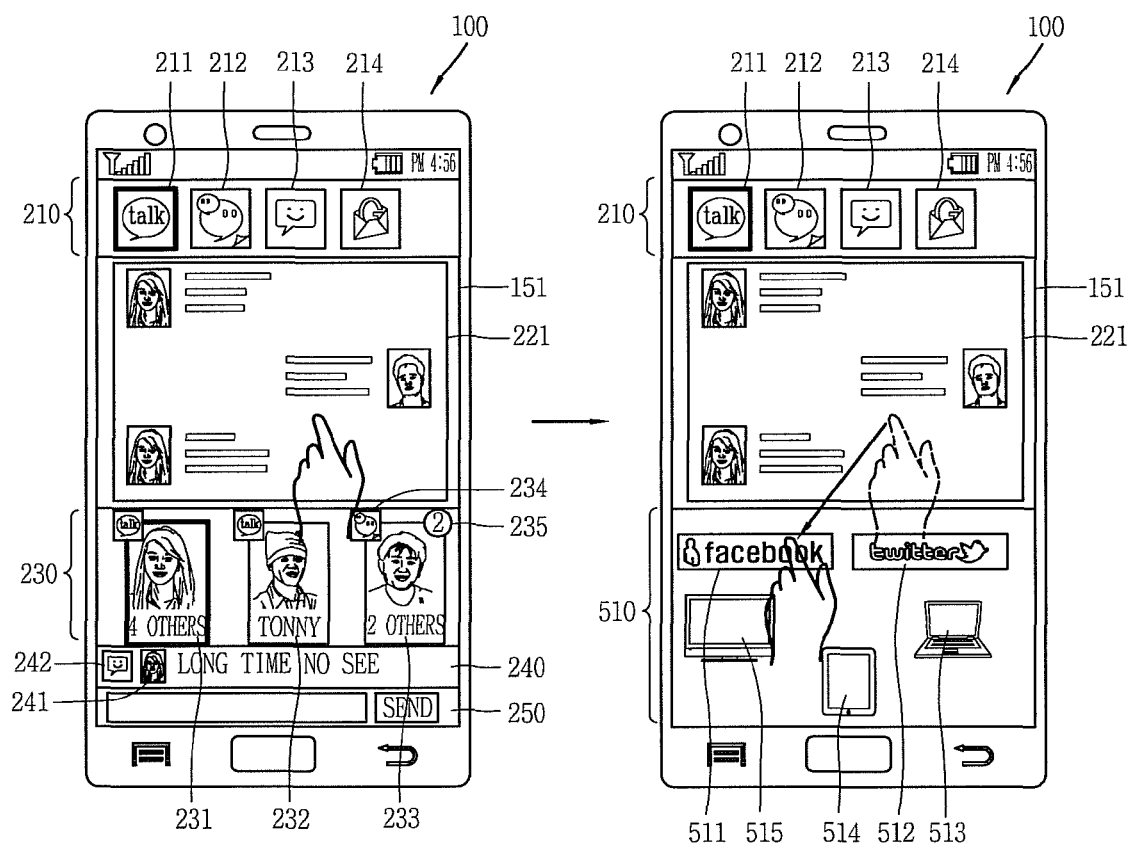
FIG. 13 is a conceptual view showing a user interface of the mobile terminal in relation to sharing of the content of conversation of a message window according to an embodiment of the present invention.

FIG. 13 is a conceptual view showing a user interface of the mobile terminal 100 in relation to sharing of the content of conversation of a message window according to an embodiment of the present invention. Referring to FIG. 13, the controller 180 may control the display unit 151 to display list information 510 regarding SNSs or external devices interworking with the mobile terminal 100 in response to a first touch input (e.g., a long-press gesture) with respect to the content 221 of conversation of a message window. The list information 510 may include a plurality of SNS items 511 and 512 and a plurality of external device items 513 to 515.

Thereafter, when a second touch input (e.g., a drag gesture) starting from the content 221 of conversation of the message window and ending in any one of the items of the list information 510 is detected, the controller 180 may transmit the content 221 of conversation of the message window to a server of the SNS of an external device corresponding to any one item.

In the embodiments of the present invention, the foregoing method can be implemented as codes that can be read by a processor in a program-recorded medium. The processor-readable medium may include a ROM, a RAM, a CD-ROM, a magnetic tape, a floppy disk, an optical data storage device, and the like. The processor-readable medium also includes implementations in the form of carrier waves or signals (e.g., transmission via the Internet).

The mobile terminal according to the embodiments of the present disclosure is not limited in its application of the configurations and methods, but the entirety or a portion of the embodiments can be selectively combined to be configured into various modifications.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a display unit configured to display, on a screen, a plurality of identification items corresponding to a plurality of message windows that are open for message communication among a plurality of participants, wherein the displayed identification items includes a first identification item corresponding to a first message window and a second identification item corresponding to a second message window; and
a controller configured to:
receive a touch-and-drag input at the first identification item;
in response to the received touch-and-drag input, control the display unit to move the first identification item to overlap at least a portion of the second identification item;
select, from among the participants of the first message window, at least one participant having a valid account with respect to a message service corresponding to the second message window when the first identification item is displayed to overlap the portion of the second identification item; and invite the selected participant to the second message window, wherein an unselected participant of the first message window not having the valid account is not invited to the second message window.

2. The mobile terminal of claim 1, wherein the display unit receives the touch-and-drag input and the controller controls the display unit to move the displayed first identification item based on the touch-and-drag input.

3. The mobile terminal of claim 1, wherein in response to selection of one of the plurality of identification items, the controller controls the display unit to display a conversation of a message window corresponding to the selected identification item.

4. The mobile terminal of claim 3, wherein after the controller invites the selected participant to the second message window, the controller controls the display unit to change conversation of the first message window to conversation of the second message window.

5. The mobile terminal of claim 3, wherein in response to a touch input to the display unit, the controller changes conversation of a message window corresponding to the selected identification item to conversation of a different message window.

6. The mobile terminal of claim 3, wherein in response to a touch input to the display unit with respect to a participant designated in the message window corresponding to the selected identification item, the controller controls the display unit to display a message received from the designated conversation participant from the conversation.

7. The mobile terminal of claim 1, wherein the plurality of message windows each separately correspond to a different one of a plurality of message services.

8. The mobile terminal of claim 7, wherein when a message is received through a first one of a plurality of message services from a participant associated with one of the plurality of message services, the controller determines whether or not a second one of the message services is selected, and in response to selection of the second one of the message services, the controller controls the display to display a message window corresponding to the second one of the message services and invites a participant that transmitted the received message to a message window corresponding to the second one of the message services.

9. The mobile terminal of claim 1, wherein the controller controls the display unit to display additional information regarding each of the plurality of message windows.

10. The mobile terminal of claim 9, wherein the additional information includes one of source information regarding a usage message service with respect to each of the plurality of message windows, information regarding a conversation participant, or information regarding a number of unread messages.

11. The mobile terminal of claim 10, wherein in response to receiving a touch input applied to the information regarding the number of unread messages, the controller controls the display unit to display a pop-up window and displays at least one of the unread messages in the pop-up window.

12. A method for controlling a mobile terminal that includes a display unit to sense a touch input, the method comprising:

opening a plurality of message windows for message communication among a plurality of participants;

displaying, on a screen, a plurality of items corresponding to the plurality of message windows, wherein the displayed items includes a first identification item corresponding to a first message window and a second identification item corresponding to a second message window;

receiving a touch-and-drag input at the first identification item;

in response to the received touch-and-drag input, controlling the display unit to move the first identification item to overlap at least a portion of the second identification item;

selecting, from among the participants of the first message window, at least one participant having a valid account with respect to a message service corresponding to the second message window when the first identification item is displayed to overlap the portion of the second identification item, and inviting the selected participant to the second message window, wherein an unselected participant of the first message window not having the valid account is not invited to the second message window.

13. The mobile terminal of claim 12, wherein the displayed first identification item is moved based on the touch-and-drag input to the display unit.

14. The method of claim 12, further comprising:
receiving a selection of one of the plurality of items; and
displaying a conversation of a message window corresponding to the selected item.

15. The method of claim 12, further comprising:
after inviting the selected participant to the second message window, displaying the conversation of the second message window on the screen.

16. The method of claim 12, wherein the opening of the plurality of message windows includes opening the plurality of message windows by using a plurality of message services.

17. The method of claim 12, further comprising:
receiving a message through a first one of a plurality of messages services from a participant associated with one of the plurality of message services;
determining whether or not a second one of the message services is selected;
receiving a selection of the second one of the message services;
displaying a message window corresponding to the second one of the message services; and
inviting the participant that transmitted the received message to the message window corresponding to the second one of the message services.

18. The method of claim 12, further comprising displaying additional information regarding each of the plurality of message windows.

19. The method of claim 18, wherein the additional information includes one of source information regarding a usage message service with respect to each of the plurality of message windows, information regarding a participant, or information regarding a number of unread messages.

20. The method of claim 19, wherein in response to receiving a touch input applied to the information regarding the number of unread messages, displaying a pop-up window that includes at least one of the unread messages.

21. The mobile terminal of claim 1, wherein:
the first message window corresponds to a first message service;

the second message window corresponds to a second message service different from the first message service; and the controller is capable of displaying the first and second message windows to the different areas of the display unit based on the first and second message services.

22. The mobile terminal of claim 1, wherein in response to selection of one of the plurality of identification items, the controller controls the display unit to display a conversation of a message window corresponding to the selected identification item, wherein in response to a touch input to the display unit with respect to a participant designated in the message window corresponding to the selected identification item, the controller extracts at least one message received from the designated participant from the conversation and controls the display unit to display the at least one message extracted from the conversation.

23. The method of claim 12, comprising:

selecting one of the plurality of identification items;

displaying a conversation of a message window corresponding to the selected identification item;

receiving a touch input to the display unit with respect to a participant designated in the message window corresponding to the selected identification item;

extracting at least one message received from the designated participant from the conversation; and displaying the at least one message extracted from the conversation.

\* \* \* \* \*